Nov. 11, 1930. S. HALVORSEN Re. 17,861

PNEUMATIC FEED MECHANISM

Original Filed Dec. 22, 1924 6 Sheets-Sheet 1

Inventor:

Severin Halvorsen

By A. Miller Belfield

Atty.

Nov. 11, 1930. S. HALVORSEN Re. 17,861

PNEUMATIC FEED MECHANISM

Original Filed Dec. 22, 1924 6 Sheets-Sheet 2

Inventor:
Severin Halvorsen
By A. Miller Belfield
Atty

Nov. 11, 1930. S. HALVORSEN Re. 17,861

PNEUMATIC FEED MECHANISM

Original Filed Dec. 22, 1924 6 Sheets-Sheet 3

Inventor:
Severin Halvorsen
By A. Miller Belfield.
Atty.

Nov. 11, 1930. S. HALVORSEN Re. 17,861

PNEUMATIC FEED MECHANISM

Original Filed Dec. 22, 1924 6 Sheets-Sheet 4

Inventor:
Severin Halvorsen
By A. Miller Belfield.
Atty.

Nov. 11, 1930. S. HALVORSEN Re. 17,861

PNEUMATIC FEED MECHANISM

Original Filed Dec. 22, 1924 6 Sheets-Sheet 5

Inventor:
Severin Halvorsen
By A. Miller Belfield
Atty.

Nov. 11, 1930. S. HALVORSEN Re. 17,861

PNEUMATIC FEED MECHANISM

Original Filed Dec. 22, 1924 6 Sheets-Sheet 6

Inventor:
Severin Halvorsen
By A. Miller Belfield
Atty.

Reissued Nov. 11, 1930

Re. 17,861

UNITED STATES PATENT OFFICE

SEVERIN HALVORSEN, OF CHICAGO, ILLINOIS, ASSIGNOR TO THE NEWSPAPER STUFFING MACHINE COMPANY, OF SEATTLE, WASHINGTON, A CORPORATION OF WASHINGTON

PNEUMATIC FEED MECHANISM

Original No. 1,676,897, dated July 10, 1928, Serial No. 757,340, filed December 22, 1924. Application for reissue filed December 18, 1929. Serial No. 415,110.

My invention relates to pneumatic feed mechanisms for feeding papers or like articles from the end of a stack or pile.

The objects of the invention are to provide an improved construction of pneumatic feed mechanism of the class specified; to secure rapidity and efficiency in operation; to increase feeding efficiency by relieving the endmost article which is to be fed, from pressure from the weight of other articles; to secure effective action with certain types of papers or articles which have not heretofore been effectively fed; to provide advantageous means for holding the articles in proper position for feeding and for releasing them at the proper time; to arrange for feeding the papers or articles when mounted in vertical position; to arrange for the effective advancement of the bottoms of the articles when mounted in vertical position; to permit effective feeding of the tops of the same when in such position; and to secure the foregoing and other desirable results in a simple and expeditious manner.

In the accompanying drawings Fig. 1 is a front view of a pneumatic feeding mechanism embodying my present invention;

Figure 1:
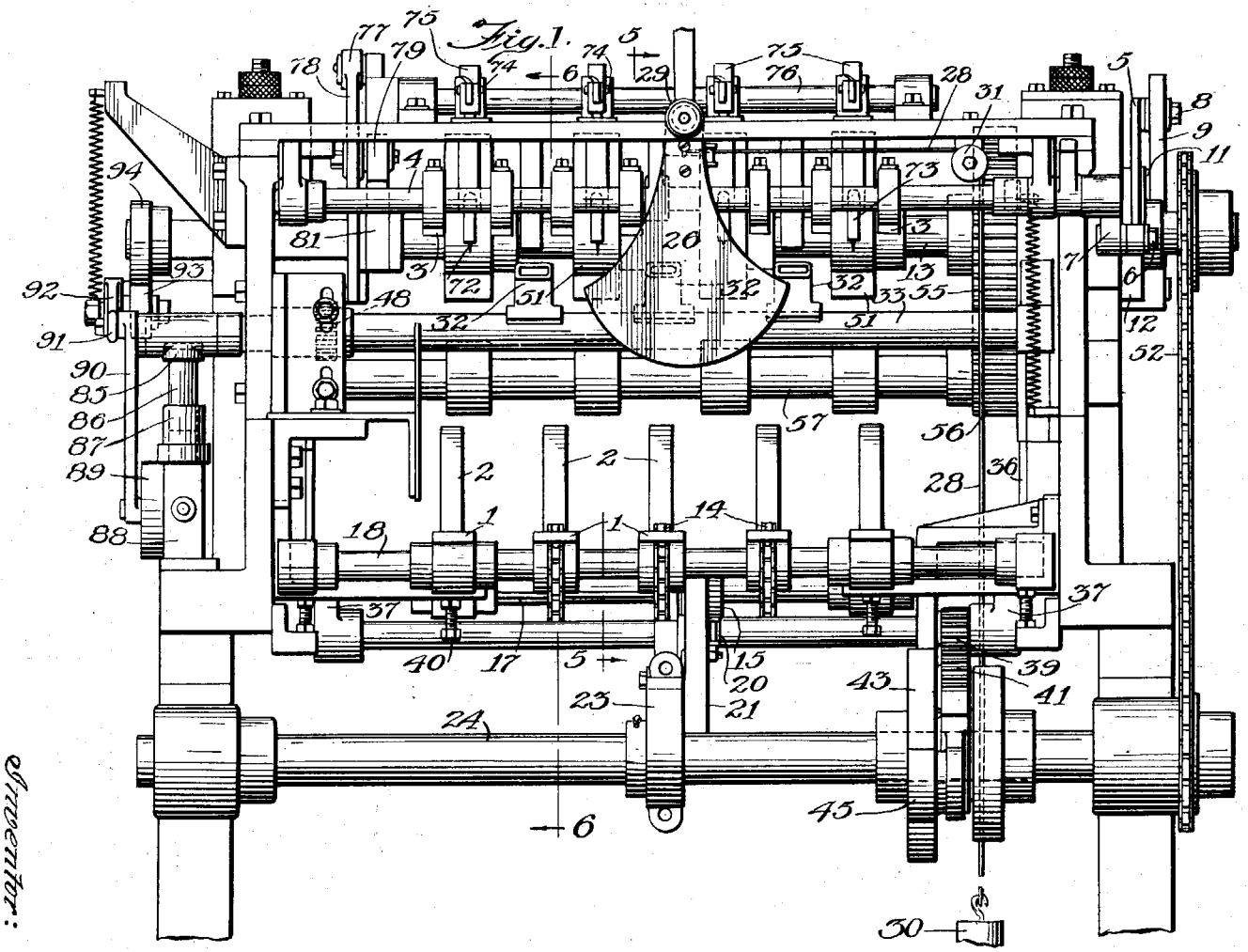
Figure 2:
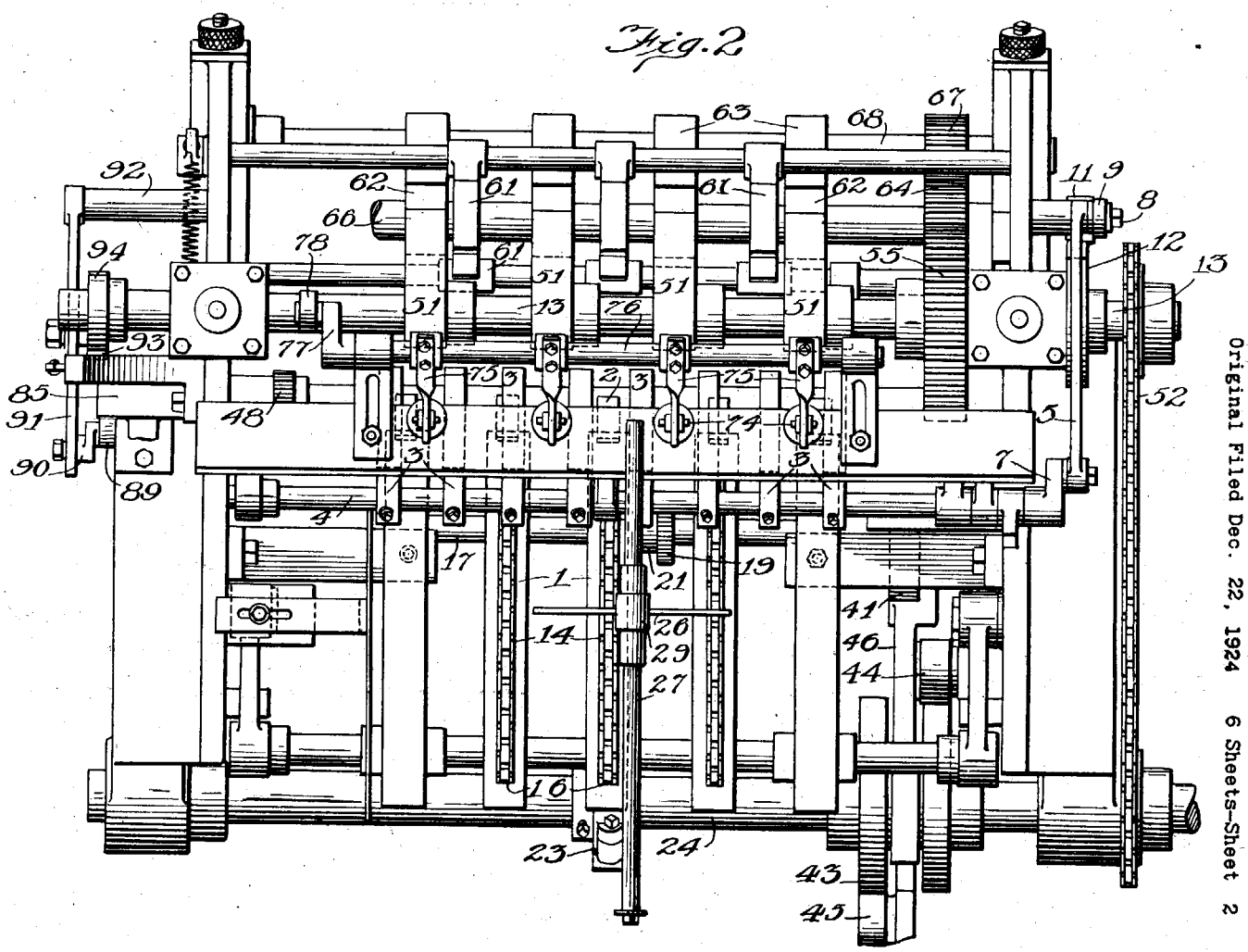
Fig. 2 is a plan view of the same.
Figure 3:
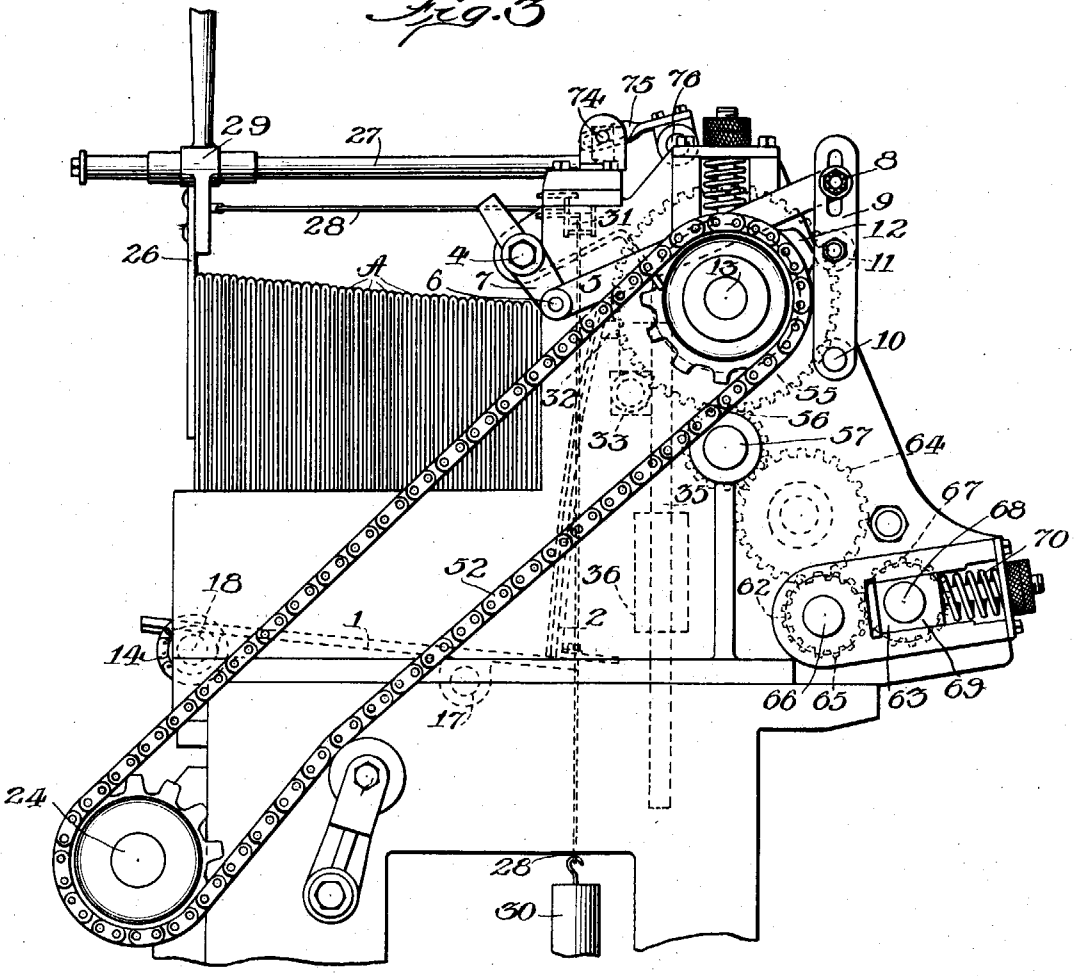
Fig. 3 is a view of the right hand end of the machine.
Figure 4:
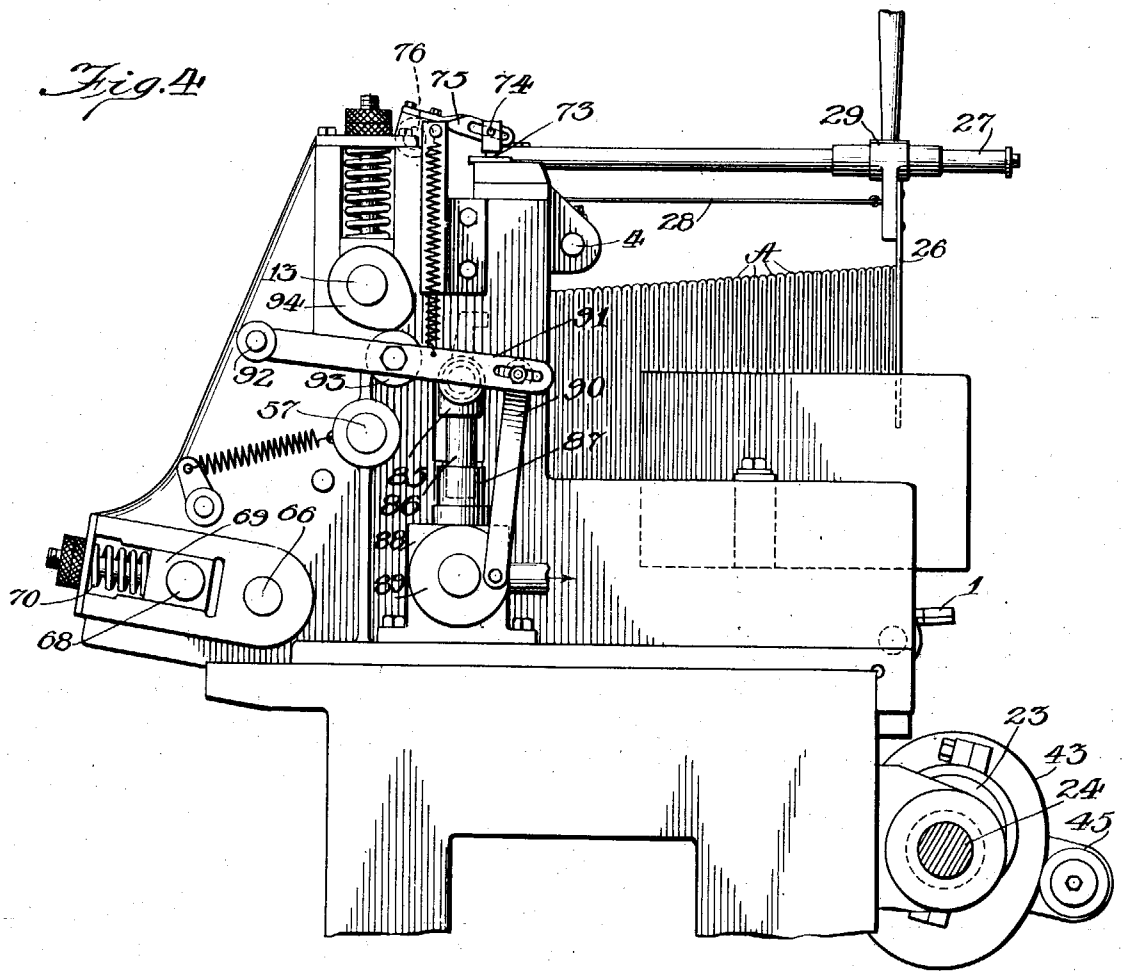
Fig. 4 is a view of the left hand end.
Figure 5:
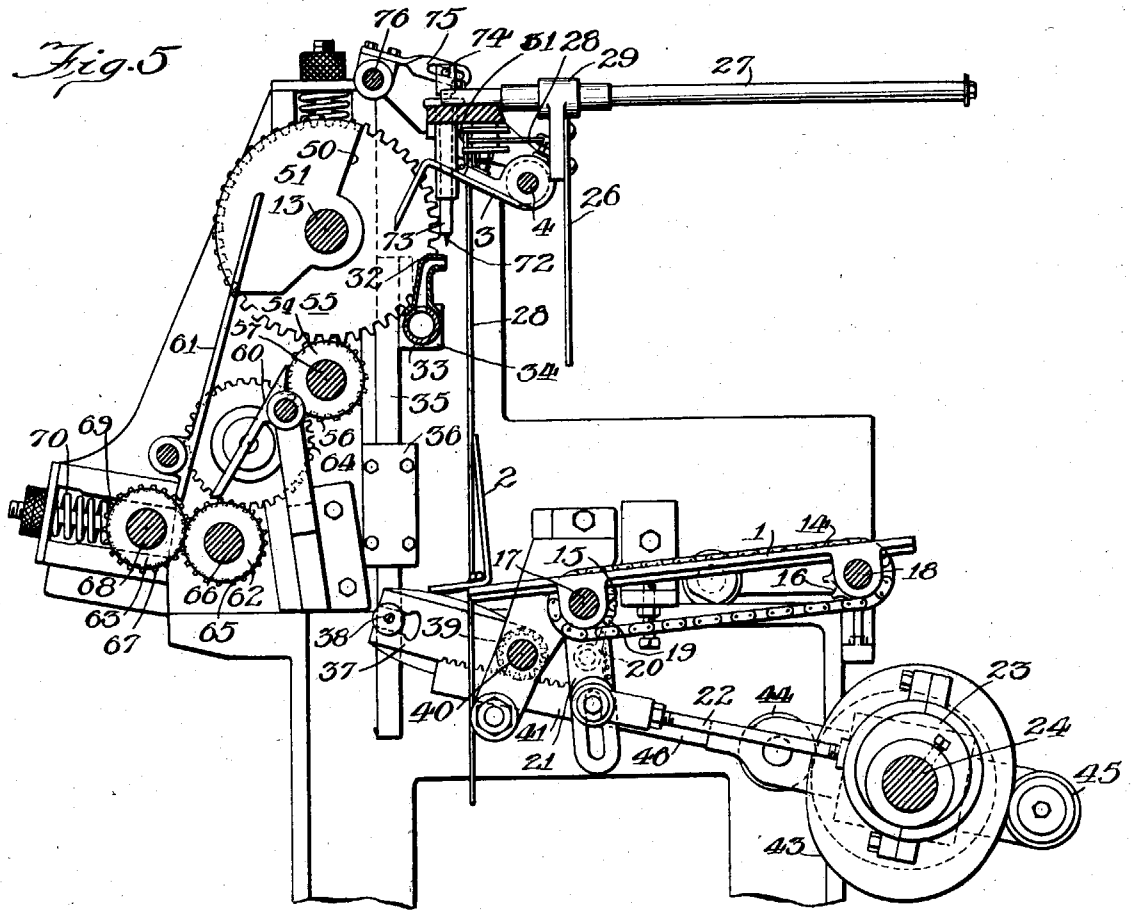
Figure 6:
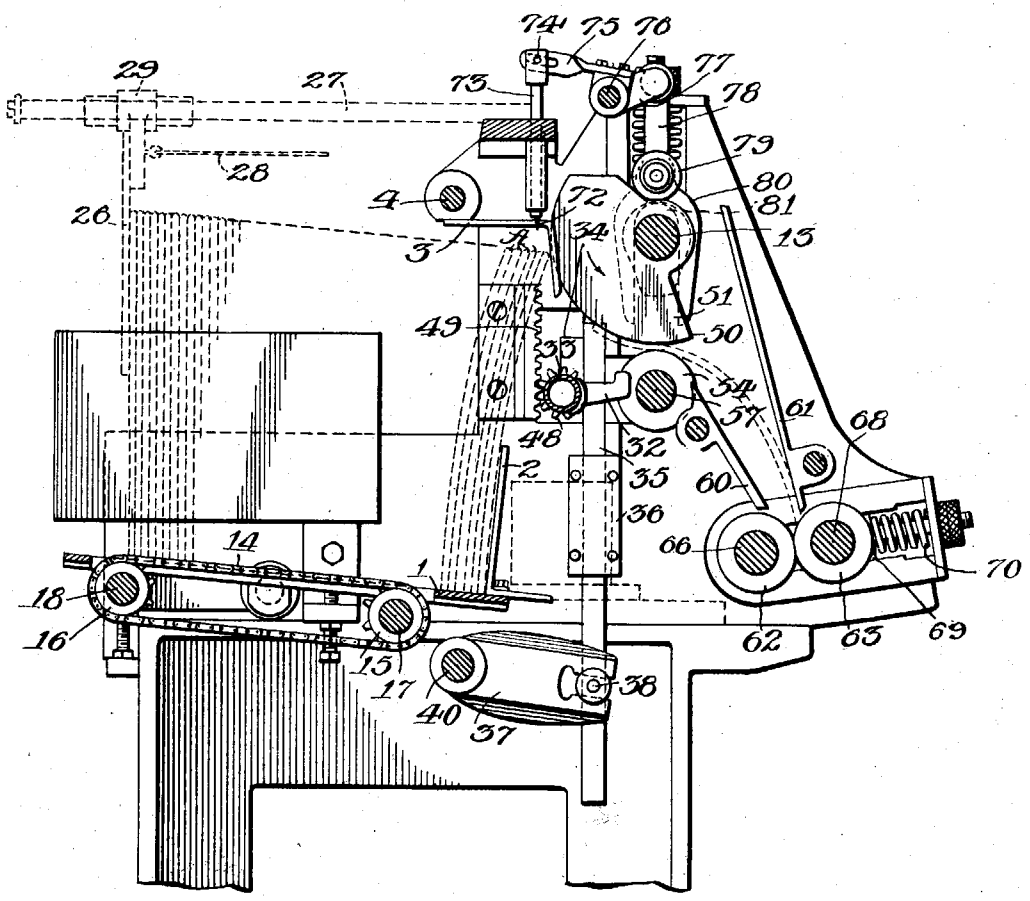

Figs. 5 and 6 are cross sections taken on lines 5—5 and 6—6 respectively, in Fig. 1.

Referring to the drawings, I show a series of papers or other articles A—A, arranged side by side vertically so as to make a substantially horizontally extending pile. Where the articles are newspaper sections, the folded edges thereof are preferably uppermost and the cut edges lowermost, as shown in Fig. 6. A supporting plate 1 is provided for the endmost articles or papers which are to be fed, and an upright plate 2 is provided for supporting the endmost article and so supporting the stack or pile against falling. Fingers 3 are arranged at the top of the stack or pile so as to engage and hold the upper folded edges of the papers. These fingers are actuated intermittently so as to release the endmost paper, this being done by mounting the fingers on the rotary shaft 4 which is rocked by link 5 pivotally connected at 6 to arm 7 on said shaft, and also pivotally connected at 8 to rocker arm 9, pivoted at 10 and carrying roller 11 which is actuated by cam 12 on rotary shaft 13.

The papers or articles are advanced forwardly as they are fed by means of a feed or advancing chain 14 supporting the lower unfolded edges of said articles and travelling over sprocket wheels 15 and 16 on shafts 17 and 18, respectively, shaft 17 being driven by sprocket arrangement comprising sprocket wheel 19 on shaft 17 and pawl 20 on swinging arm 21 which is reciprocated by link 22 actuated by cam 23 on main drive shaft 24.

The upper portions of the papers or articles being fed are advanced by a plate 26 slidably mounted on a rod 27, a flexible connector or cord 28 being attached to the slide 29 carrying said member 26 and a weight 30 being attached to the end of the flexible connector 28, which latter is passed over pulley 31 so that the weight 30 tends constantly to pull upon flexible connector 28 and thus push the upper ends of the articles forward.

The endmost article or paper after being released by fingers 3 is engaged and pulled forwardly and downwardly by pneumatic pulling devices or suckers 32 carried by a rotary tubular member 33, which is mounted for vertical reciprocation on a sliding carriage 34, which in turn is mounted at the upper end of a slidable rod or bar 35 moving in bearings 36. Rod 35 is actuated to reciprocate suckers 32 by swinging arm 37 carried by oscillatory shaft 40, which latter is rocked so as to swing member 37 by pinion 39 on shaft 40 and rack 41 engaging pinion 39. Rack 41 is reciprocated by cam 43 mounted on shaft 24 and engaging rollers 44 and 45 on link 46 carrying rack 41.

Suckers 32 are swung forwardly and downwardly when their sliding carriage 34 is moved downwardly by means of pinion 48 on tubular member 33, said pinion engaging stationary rack 49. This downward and forward movement of suckers 32 pulls released edge of endmost paper section outwardly and downwardly.

Such outwardly and downwardly pulled paper edge is then engaged by engaging face 50 of rotary segment 51 mounted on rotary shaft 13, which latter is driven by sprocket chain 52 running to main drive shaft 24.

Released paper edge struck by segment 51 is swung further downwardly and forwardly and is then gripped between segment 51 and gripping roll 54, which latter is driven by gear 55 on shaft 13 and pinion 56 on roll shaft 57. The gripped paper is by this means withdrawn entirely from pile or stack of papers and then is moved downwardly between guides 60 and 61 and between delivery or exit rolls 62 and 63. The latter are driven by gear 64, which is driven by pinion 56 and gear 64 drives pinion 65 on roll shaft 66, and pinion 65 drives pinion 67 on roll shaft 68. Roll shaft 68 is mounted in adjustable bearing 69 controlled by spring 70, making roll 63 adjustable to accommodate different thicknesses of paper. To hold upper edges of paper steady in the pile or stack, pins or stabbing devices 72 are provided to stab or engage the upper folded edges of the papers at proper times. These devices 72 are reciprocated to engage and disengage the paper edges, the reciprocation being preferably in a vertical manner as by mounting them on the vertically reciprocating rods 73 having pivotal connections at 74 with swinging arms 75 on rock shaft 76, which latter is rocked by arm 77 pivotally connected with link 78 carring roller 79 and having forked end 80 straddling shaft 13, which latter is provided with cam 81 acting on roller 79 to reciprocate link 78 upwardly and downwardly, and thereby vertically reciprocate pin holding devices 72.

Tubular member 33 carrying suckers 32 is mounted for reciprocating in bearings 85, one of which carries a pipe 86 sliding in a pipe section 87 extending to valve block 88 having ports controlled by rotary valve 89 actuated by link 90, which is in turn actuated by rocker arm 91 pivoted at 92 and carrying roller 93 acted on by cam 94 on rotary cam shaft 13. By this arrangement suction for the suckers 32 is controlled so that there is suction to engage and pull down endmost paper at proper time, but no suction when paper is engaged and actuated by rotary segment 51 and gripping roll 54.

By this invention, by arranging the papers or articles in a substantially vertical position, the endmost article can be very readily removed because it is not necessary for it to bear the weight of the articles above it, as would be the case in a vertical pile with the articles horizontal. This permits feeding of articles of some kinds which could not be fed properly in the vertical pile. Furthermore, pressure may be exerted on these vertically arranged articles so as to feed them forward in the desired manner, but this pressure is mechanically applied and therefore may be regulated and is always uniform and constant, and not variable as would be the case in a vertical pile of horizontal articles. This further simplifies feeding and makes it more efficient and effective. It will also appear that the articles may be effectively held both by the swinging fingers and the reciprocating stabbing or engaging pins, and consequently any tendency of the articles to fall or flop downwardly will be overcome and feeding will thus be stabilized in this respect. It will also be seen that the mechanism for engaging and pulling down the endmost article is effective and efficient, so that altogether a high degree of efficiency and great speed of action may be secured.

It will be understood that changes and modifications may be made without departing from the spirit of the invention.

What I claim is:

1. Feeding mechanism in which the articles are arranged in vertical position, said feeding mechanism having means acting upon the articles to advance them in a substantially horizontal manner and feeding devices comprising suckers for engaging and pulling out the upper edge of the foremost article, means for reciprocating said suckers vertically, and for swinging the same outwardly when moved downwardly, a rotary segment cooperating with the suckers and a gripping roll cooperating with said rotary segment.

2. Feeding mechanism in which the articles are arranged in vertical position, said feeding mechanism having means acting upon the articles to advance them in a substantially horizontal manner and feeding devices comprising suckers for engaging and pulling out the upper edge of the foremost article, means for reciprocating said suckers vertically, and for swinging the same outwardly when moved downwardly, a rotary segment cooperating with the suckers, a gripping roll cooperating with said rotary segment, and holding fingers for engaging the upper edges of the articles.

3. Feeding mechanism in which the articles are arranged in vertical position, said feeding mechanism having means acting upon the articles to advance them in a substantially horizontal manner and feeding devices comprising suckers for engaging and pulling out the upper edge of the foremost article, means for reciprocating said suckers vertically, and for swinging the same outwardly when moved downwardly, a rotary segment cooperating with the suckers, a gripping roll cooperating with said rotary segment, and holding fingers for engaging the upper edges of the articles, and stabbing devices for cooperating with said fingers to hold the articles in position.

4. Feeding mechanism in which the articles are arranged in vertical position, said feeding mechanism having means acting upon the articles to advance them in a substantially horizontal manner and feeding devices comprising suckers for engaging and pulling out the upper edge of the foremost article, means for reciprocating said suckers vertically, and for swinging the same outwardly when moved downwardly, a rotary segment cooperating with the suckers, a gripping roll cooperating with said rotary segment, holding fingers for engaging the upper edges of the articles, and stabbing devices for cooperating with said fingers to hold the articles in position and mechanism for actuating said holding fingers and stabbing devices.

5. Feeding mechanism in which the articles are arranged in vertical position, said feeding mechanism having means acting upon the articles to advance them in a substantially horizontal manner and feeding devices comprising suckers for engaging and pulling out the upper edge of the foremost article, means for reciprocating said suckers vertically, and for swinging the same outwardly when moved downwardly, a rotary segment cooperating with the suckers, a gripping roll cooperating with said rotary segment, and means for controlling the suction to said suckers.

6. Feeding mechanism in which the articles are arranged in vertical position, said feeding mechanism having means acting upon the articles to advance them in a substantially horizontal manner and feeding devices comprising suckers for engaging and pulling out the upper edge of the foremost article, means for reciprocating said suckers vertically, and for swinging the same outwardly when moved downwardly, a rotary segment cooperating with the suckers, a gripping roll cooperating with said rotary segment, and means for controlling the suction to said suckers, said means comprising valve mechanism and a cam and link arrangement for actuating the same.

7. Feeding mechanism in which the articles are arranged vertically having engaging devices mounted above the endmost articles and arranged for vertical reciprocation to and from the same.

8. Feeding mechanism in which the articles are arranged vertically having engaging devices mounted above the endmost articles and arranged for vertical reciprocation to and from the same, said engaging devices comprising pins adapted for insertion into the upper edges of the articles.

9. Feeding mechanism in which the articles are arranged vertically having engaging devices mounted above the endmost articles and arranged for vertical reciprocation to and from the same, said engaging devices comprising pins adapted for insertion into the upper edges of the articles, and means for reciprocating said pins.

10. Feeding mechanism in which the articles are arranged vertically having engaging devices mounted above the endmost articles and arranged for vertical reciprocation to and from the same, said engaging devices comprising pins adapted for insertion into the upper edges of the articles, and means for reciprocating said pins, said means comprising a swinging arm mounted on a rotary shaft and a cam and link arrangement for swinging said shaft.

SEVERIN HALVORSEN.